(12) United States Patent
Bulkowski et al.

(10) Patent No.: US 8,428,090 B2
(45) Date of Patent: *Apr. 23, 2013

(54) TRANSMITTING TIMING INFORMATION FOR CONTENT IN A DATA STREAM

(75) Inventors: Brian Bulkowski, Berkeley, CA (US); Carolyn Wales, Menlo Park, CA (US); Sam Hsu, Fremont, CA (US); James Helman, San Carlos, CA (US); Joseph Decker, San Jose, CA (US); Brock Wagenaar, Cambridge, MA (US); Mark Vickers, Belmont, CA (US)

(73) Assignee: TVWorks, LLC, Philadelphia, PA (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/074,522

(22) Filed: Mar. 29, 2011

(65) Prior Publication Data
US 2011/0173669 A1 Jul. 14, 2011

Related U.S. Application Data

(63) Continuation of application No. 10/407,090, filed on Apr. 2, 2003, now Pat. No. 7,944, 953.

(60) Provisional application No. 60/370,024, filed on Apr. 3, 2002.

(51) Int. Cl.
*H04J 3/02* (2006.01)
*H04J 3/06* (2006.01)
*H04J 3/04* (2006.01)
*H04J 3/22* (2006.01)
*H04N 7/173* (2011.01)

(52) U.S. Cl.
USPC ........... 370/537; 370/503; 370/535; 370/542; 370/543; 725/87; 725/91; 725/103

(58) Field of Classification Search .................. 370/537, 370/503, 535, 542, 543; 725/87, 91, 103, 725/88, 102; 386/205, 245, 248, 324, 343, 386/345, 201, 337
See application file for complete search history.

(56) References Cited

U.S. PATENT DOCUMENTS

| 5,765,164 | A | * | 6/1998 | Prasad et al. ........................ 1/1 |
| 5,818,440 | A | | 10/1998 | Allibhoy et al. |
| 6,370,688 | B1 | * | 4/2002 | Hejna, Jr. ...................... 725/101 |
| 6,516,376 | B1 | * | 2/2003 | Christine et al. .............. 710/305 |
| 6,543,053 | B1 | * | 4/2003 | Li et al. ........................... 725/88 |
| 6,771,704 | B1 | | 8/2004 | Hannah |
| 6,792,617 | B2 | | 9/2004 | Gorbatov et al. |
| 6,798,838 | B1 | * | 9/2004 | Ngo ........................ 375/240.19 |
| 7,024,678 | B2 | * | 4/2006 | Gordon et al. .................. 725/88 |
| 7,079,176 | B1 | | 7/2006 | Freeman et al. |
| 7,120,871 | B1 | | 10/2006 | Harrington |
| 7,155,735 | B1 | | 12/2006 | Ngo et al. |
| 7,221,387 | B2 | | 5/2007 | Fernandez et al. |
| 7,243,139 | B2 | | 7/2007 | Ullman et al. |
| 7,277,953 | B2 | | 10/2007 | Wils et al. |
| 7,284,124 | B1 | | 10/2007 | Ginsberg |
| 7,293,175 | B2 | | 11/2007 | Brown et al. |
| 7,355,621 | B1 | | 4/2008 | Fernandez et al. |
| 2001/0037500 | A1 | | 11/2001 | Reynolds et al. |
| 2002/0056136 | A1 | | 5/2002 | Wistendahl et al. |

(Continued)

*Primary Examiner* — Hoang-Vu A Nguyen-Ba
(74) *Attorney, Agent, or Firm* — Banner & Witcoff, Ltd.

(57) ABSTRACT

The invention provides a method and apparatus that addresses and resolves the issues currently affecting the ability to offer Enhanced TV, in particular, those issues concerning timing and synchronization, interaction with other modules in the STB, and distribution.

20 Claims, 5 Drawing Sheets

U.S. PATENT DOCUMENTS

| | | |
|---|---|---|
| 2002/0059623 A1 | 5/2002 | Rodriguez et al. |
| 2002/0089946 A1 | 7/2002 | Hutchings |
| 2002/0124246 A1 | 9/2002 | Kaminsky et al. |
| 2003/0018980 A1* | 1/2003 | Gorbatov et al. ............. 725/133 |
| 2003/0056224 A1 | 3/2003 | Stone |
| 2003/0072375 A1 | 4/2003 | Soundararajan |
| 2003/0084453 A1 | 5/2003 | Laughlin et al. |
| 2004/0031058 A1 | 2/2004 | Reisman |
| 2004/0059941 A1 | 3/2004 | Hardman et al. |
| 2004/0177270 A1 | 9/2004 | Little et al. |
| 2004/0215718 A1 | 10/2004 | Kazmi et al. |
| 2006/0129838 A1 | 6/2006 | Chen et al. |

* cited by examiner

TRANSMITTING TIMING INFORMATION FOR CONTENT IN A DATA STREAM

This application is a continuation of U.S. patent application Ser. No. 10/407,090, filed Apr. 2, 2003, which claims the benefit of U.S. Provisional Application No. 60/370,024, filed Apr. 3, 2002. U.S. patent application Ser. No. 10/407,090 and U.S. Provisional Application No. 60/370,024 are both incorporated in their entireties by reference herein.

BACKGROUND OF THE INVENTION

1. Technical Field

The invention relates to information distribution. More particularly, the invention relates to a method and apparatus for transmitting data in a data stream.

2. Description of the Prior Art

The term "Enhanced TV" refers to the delivery of additional data to a client beyond the current standards of audio, video, teletext, and subtitle data. These data may be used to enhance the viewing experience in many ways—they may be used to prompt the user to take certain actions, they may be used to place informational graphics on the screen, or they may be used to create truly interactive programming, where the viewer has a great deal of control over what appears on the screen. As a medium, Enhanced TV is still in its infancy, and many opportunities for applying the technology have yet to be explored.

The technology of Enhanced TV is one of distributing a shared user experience to many clients simultaneously. The user experience can be more dynamic, flexible, and interactive than pure audio or video experiences. This technology can be used without audio or video, or with audio or video alone.

There are several fundamental pieces of an Enhanced TV system. On the broadcast or head end side, there is a source, which is often a server or suite of servers that schedule and format the enhancement data. The data are then integrated into the audio and video data streams, and sent down to the end users' homes through a broadcast transmission system. The essential action of the source is the creation of a set of data for later distribution. Although the source is referred to in this document as a server, the source may not be a server in the strict sense. For instance, the source could be a software component that writes files to a disk for later broadcast, or annotates an MPEG file, or creates one or more proprietary files to be read by a transmission agent, such as a spooler.

On the end user side, there is a module in the television or set top box client in the viewer's home that interprets the enhanced TV data. This module may carry out commands in the data itself, or it may launch a dedicated application, referred to as an enhancement, which may have its own methods of listening to and interpreting the enhanced TV data.

In developing Enhanced TV systems and Enhanced TV content/enhancements, several issues arise:

1) Synchronization and Timing. Many enhancements rely on very close synchronization between the data stream as delivered to the enhancement and the audio/video shown to the user. For instance, a quiz show enhancement should not present questions until the on-screen announcer had announced them. Even if the audio/video data and the enhanced TV data are delivered to the set top box at the same time, they may take very different data paths internally. Different delays in these data paths create synchronization problems that are visible to the viewer. Delays may also come from other sources as well as the client, e.g. servers, networks, and transmission media all may introduce their own delays.

2) Interactions with other modules in the client. In many of the more modern and complex client systems, there are many modules besides the Enhanced TV module running concurrently. These modules may include an Electronic Program Guide (EPG), Video On Demand services, and billing systems, among others. Defining how the Enhanced TV module and its subservient enhancements interact with these other modules is non-trivial because some, but not all, of the capabilities of these other modules must be exposed to the Enhanced TV system. The picture is further complicated by the fact that different network operators have different needs, and wish to expose different pieces of the full system to the Enhanced TV subsystem. Network operators may additionally have different business relationships with different enhanced content providers, and may wish to expose or hide parts of the system based on those business relationships.

3) Distribution. Because Enhanced TV data is created to enhance television broadcasts, Enhanced TV data originate from many different sources, e.g. broadcasters and television content producers. Unlike conventional television programming, multiple enhancements may be active and consuming resources at the same time. It is important to be able to make sure enhancements from distributed and mutually unaware sources be able to run in a single integrated environment.

4) Loading. Because Enhanced TV data are often not resident on the client, and must be pulled off of a data stream, there is often a delay before the enhancement can be presented to the user. Furthermore, limitations of the client, server, and distribution mechanism may make it impossible to run the enhancement correctly. Such limitations may include memory or resource limitations on the client, and data delivery errors within the server and distribution mechanism. For the user experience, it is important that some amount of functionality of the enhancement be guaranteed before any notification of the enhancement is presented to the user.

It would be advantageous to provide a method and apparatus that addresses and resolves the issues currently affecting the ability to offer Enhanced TV, in particular, those issues concerning timing and synchronization, interaction with other modules in the STB, distribution, and loading.

SUMMARY OF THE INVENTION

The invention provides a method and apparatus that addresses and resolves the issues currently affecting the ability to offer Enhanced TV, in particular, those issues concerning timing and synchronization, interaction with other modules in the STB, and distribution.

DETAILED DESCRIPTION OF THE INVENTION

The invention provides a method and apparatus that addresses and resolves the issues currently affecting the ability to offer Enhanced TV, in particular, those issues concerning timing and synchronization, interaction with other modules in the client, and distribution. The invention is described in connection with an Enhanced TV system, but those skilled in the art will appreciate that the invention may be applied to other similar systems, such as recent cell phones and personal data assistants (PDAs), as well as general personal computing (PC) environments.

Figure 1:
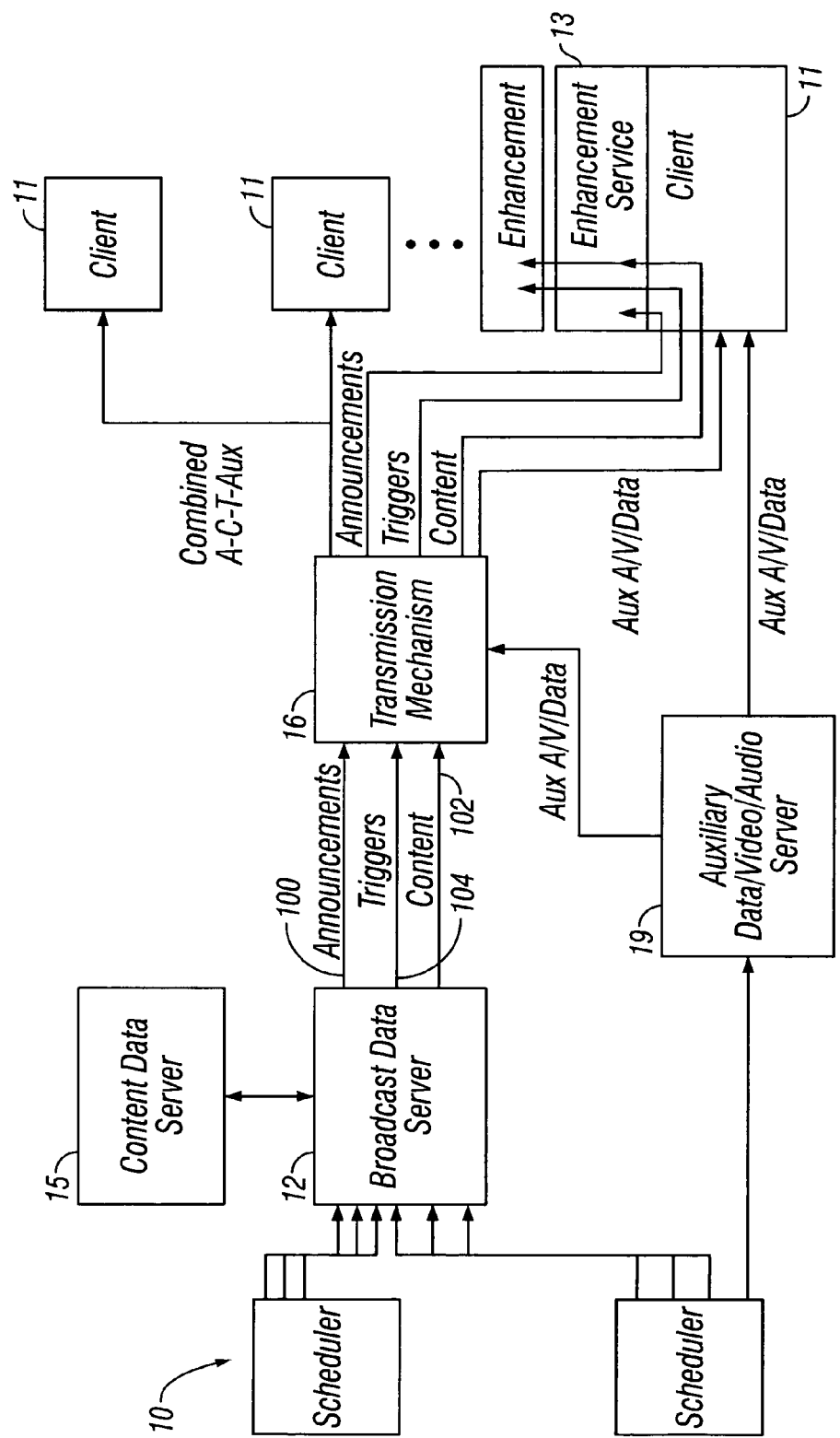
FIG. 1 is a block schematic diagram of a system architecture according to the invention.

FIG. 1 is a block schematic diagram of a system architecture according to the invention.

At a high level, the presently preferred embodiment of the invention comprises a computer (server) 12 that schedules and transmits data—, a system for distributing (transmission mechanism 16) that data to other computers (clients) 11, and one or more computers (clients) which receive the transmitted data and act on them in a defined fashion. These parts work together to for a single distributed computing system.

Also shown on FIG. 1 is an enhanced TV management system, i.e. schedulers 10, a content data server 15, and an auxiliary data/video/audio server 19. These features of an enhanced TV system are well known to those skilled in the art.

The computer that schedules and transmits is known as a broadcast data server 12. The computer that receives and interprets the data streams is known as a broadcast client 11. The infrastructure for distributing the data is known as the transmission mechanism 16. The broadcast data server 12 may be a single computer or it may consist of many computers collaborating to create one or many broadcast data streams.

Figure 2:
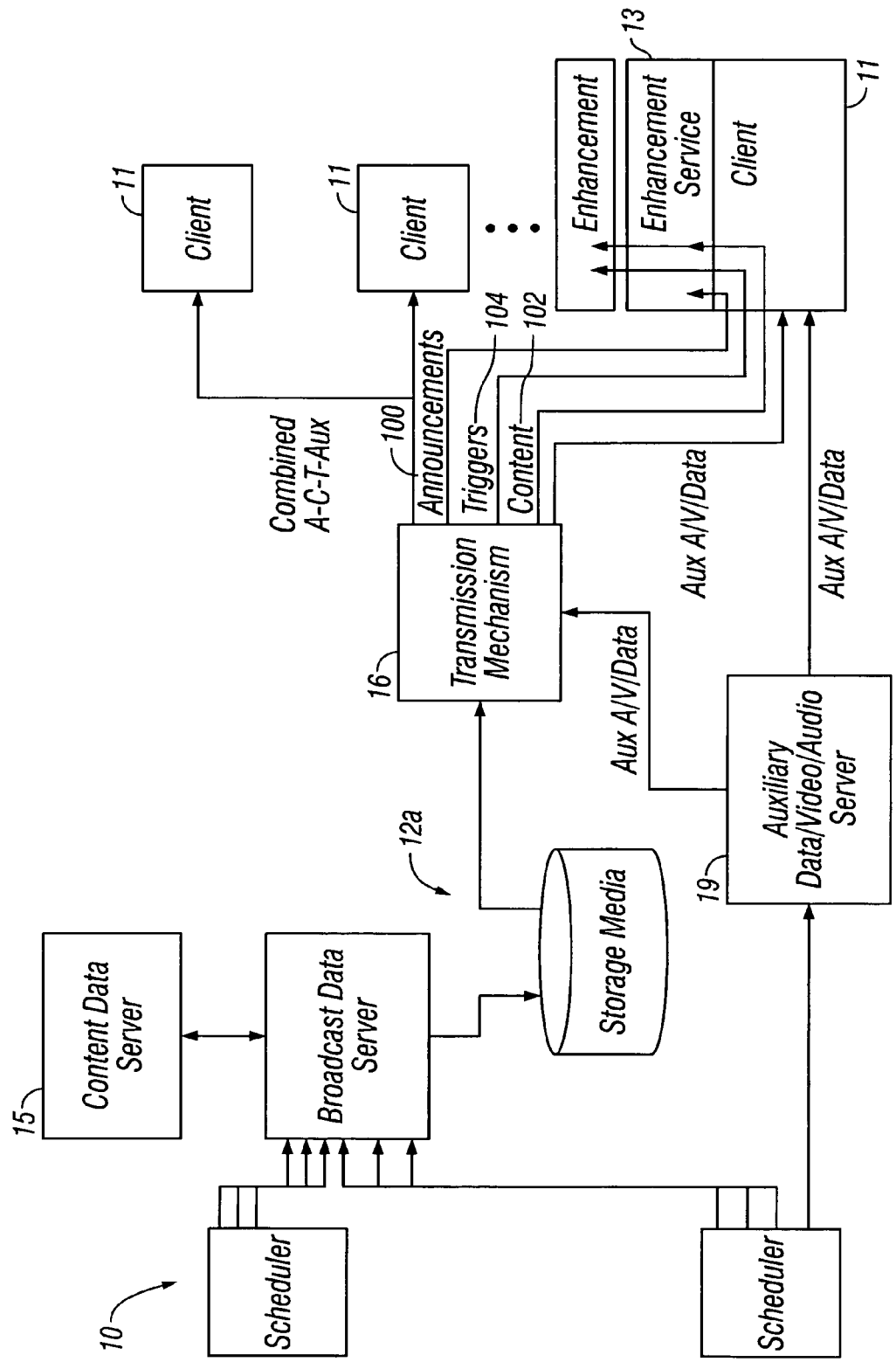
FIG. 2 is a block schematic diagram of a system architecture according to the invention when there is no broadcast data server.

Note that the broadcast data server 12 may not be a server at all. It is any device, component, software or the like that provides the transmission mechanism 16 with one or more data streams. The function of the broadcast data server 12 is the creation of data for distribution. The data may be sent through the transmission mechanism 16 immediately in a true server mode, or it may be stored in some way for broadcast or other transmission later. Such storage mechanisms may include the creation of proprietary files that can be read by a spooler, or annotations to an MPEG file, among others. One embodiment of the invention is shown in FIG. 2 (discussed below), where the data are stored in a unit that is marked Storage Media. For simplicity, this component of the invention is referred to as a "server" herein.

The broadcast data server 12 optionally communicates with a content data server 15, which is responsible for fetching or creating the content associated with the enhancement. A scheduler 10 is responsible for specifying to the broadcast data server 12 which data are to be placed on which output data streams at which times.

The broadcast data server 12 is responsible for gathering the data, often with the assistance of the content data server 15, scheduling the data so that they appear at the correct times on the output data streams, and formatting the data in a way that is compatible with the transmission mechanism 16. In the case of MPEG transmissions over a DSL connection, the data can be formatted as MPEG transport streams, but it can also be formatted as Internet Protocol IP packets in an IP based phone system, or as data to be inserted in the Vertical Blanking Interval (VBI) in an analog TV system, or in some other way appropriate to the transmission mechanism in which the invention is embodied.

There may be multiple schedulers 10 feeding a single broadcast data server, as shown in FIG. 2. This allows multiple mutually independent enhancement providers to use the system simultaneously. For instance in a digital satellite TV system, many broadcasters can use separate schedulers but the same broadcast data server to provide enhancements on their individual TV channels. Similarly, a scheduler associated with an advertisement insertion system can drive enhancements associated with advertisements, while a separate scheduler can drive enhancements associated with the standard programming.

The scheduler 10 may also communicate with one or more optional auxiliary audio, data, or video server 19. The auxiliary server 19 is responsible for sending data that are not directly enhancement-related to the client, either through the same transmission mechanism used by the enhancement, or through some other means. In the case of a digital TV system or VOD service, auxiliary server 19 can be a standard video server. Communication with an auxiliary server, while not required, is useful when synchronizing enhancement data with auxiliary data.

Note that although auxiliary server 19 is likely to be present in most embodiments of this invention, its existence is not required. Many of the high value applications of the invention involve adding to existing television infrastructure, and distributing an experience that enhances the traditional capabilities of television or radio. However, the system may present its own self contained experience.

Although the broadcast data server 12, the content data server 15, and the scheduler 10 are shown as independent entities in the figures, there is no requirement that they be so. They could be hosted on the same physical piece of equipment, or even merged into a single integral piece of software, or their functionality could be provided in a variety of other ways and combinations.

Similarly, it is possible for multiple broadcast data servers to serve a single set of clients. For instance, in a digital cable system, each broadcaster can have its own scheduler and broadcast data servers feeding into its own MPEG data streams, which would be multiplexed together into the final transport stream at the cable operator's head end.

The presently preferred broadcast server 12 sends three distinct streams for each enhancement, i.e. an Announcement stream 100, a Trigger stream 104, and a Content stream 102. These streams are shown on FIG. 1 as each having a path from a scheduler 10, through the server 12, a distribution (transmission) mechanism 16, one or more clients 11 and the Enhanced TV service 13. The Announcement stream 100 serves as a mechanism for notifying the client of which enhancements are available. The Trigger stream 104 contains time-sensitive information for the enhancement itself, and also carries the time synchronization protocol data. The Content stream 102 contains the resources that make up the enhancements themselves, or references that enable the retrieval of the enhancements. Such resources and references may include but are not limited to HTML files, JavaScript, JAR files, GIFs, binary data, URLs and reference identifiers.

These streams are transmitted to the client(s). Although it is preferred that most enhancements carry all three streams, it is not strictly necessary.

Note that a trigger in this context does not refer only to EIA 746A data. A trigger in as used herein can be any discrete chunk of information defined by the enhancement, may be formatted in any arbitrary way, and may consist of strings, numbers, binary data, and others. These data arrive on the client as a unit, and can be marked for presentation to the enhancement at a predefined time.

As an example, in an interactive TV system running over DSL lines, the server could produce streams that are combined into the MPEG data feed that is sent to the digital set top boxes or digitally enabled TVs. The Announcement stream could contain tables of name value pairs, where the names specify known attributes of the enhancement, such as the URL or other unique reference identifier for the enhancement to run, the start and stop time for the enhancement, and information on how to prompt the viewer to run the enhancement. The Trigger stream could contain information relating to state changes in the enhancement, for instance name value pairs of "Question" and "Answer" relating to questions currently being asked on a quiz show. The Content stream could contain the data associated with the enhancement, including the root content (in this example, possibly "quizshow.html") and associated resources (for instance, "questions.js", "correct.gif", etc).

In the above example, the streams could be formatted as MPEG private sections, and are associated with particular video services through advertisement in the Program Map Table (PMT), or similar mechanism. Such a mechanism allows the client to find the enhancements associated with standard broadcast data.

Data for different enhancements may share streams, that is, there is no requirement that the streams for different enhancements be distinct. In the previous example, for instance, all enhancements for a particular MPEG/DVB service can share the same Announcement, Content, and Trigger streams. There is also no requirement that enhancements must share the same streams.

Data are transmitted through the transmission mechanism to one or more clients, processed, and the enhancement displayed to the users The transmission mechanism is inherently digital, although the digital signal typically is encoded in analog signals. The transmission mechanism can be of variable delay, and is commonly comprised of one or many computers, devices, and data paths. An example of a low delay medium is a digital television transmission system, which carries digital data along with the digital television system. An example of a high delay system is a system that encodes data on a digital video tape, and retransmission through a digital television transmission system occurs at a later time. Another example is a stock ticker distribution system based on Internet Protocol (IP) networking destined for portable, networked devices such as cell phones. The broadcast media itself can be an RF cable network, as in the preceding example, but can also be phone lines, Ethernet, satellite signals, fiber optics, or any other broadcast transmission medium. It should be understood that the principles of the present invention apply not only to systems using broadcast transmission mediums but also to systems employing pointcast, multicast and other transmission mediums.

On the client, a software element, the enhancement service 13 in FIG. 1, listens to the Announcement stream, and processes the data that it receives on this stream. Data on the Announcement stream contain commands to start and stop enhancements, and references to the enhancement being launched. Depending on the constraints in the client itself, for instance whether the user wishes to see or otherwise access the enhancements, and constraints imposed by the network operator, for instance whether broadcast owners of the currently tuned TV service have paid to have their enhancements visible, the enhancement service can launch an enhancement.

An enhancement, in the terms of this invention, is a set of content that can be run (e.g., interpreted, executed or otherwise run) and displayed in the client environment. The "runable" (e.g., interpretable or executable) elements of an enhancement can be in program format, such as object code, Java byte code or interpretable JavaScript; or they can be structured as data for a presentation engine, such as html. The content associated with an enhancement can also contain binary data items for display to the user, for example, GIFs, JPEGs, and WAVs. Some or all of an enhancement's content may already be resident on the client when the command to start the enhancement comes in on the Announcement stream; some or all of an enhancement's content may be pulled in from the Content stream. For example, all of the data necessary to display an enhancement associated with a special one-time only broadcast, such as the Academy Awards, are likely to be pulled in off the Content stream. However, core modules associated with a standard enhanced advertising system that are used by many advertisements are likely to be locally stored in the updateable, re-writable compact flash memory in the set top box. Alternatively, core modules could be stored locally in other set top box memory.

Launching an enhancement consists of loading the initial content needed by the enhancement onto the client if it is not already resident there, optionally displaying a prompt to the user and, if the user chooses to accept the prompt, or if the user is not given a prompt, running the initial interpretable (runable) elements or sending them to the presentation engine, as appropriate.

An enhancement may be of long duration, such as the display of a flow of stock information that lasts years, or short in duration, such as adding interaction to a 30 second television commercial.

To listen to the Announcement stream, the client must have some way of identifying this stream. In the MPEG/DVB transport example, the Announcement stream is carried at a well-known location, for example a specific PID, or advertised as a component with a well-known stream ID on the PMT. Other options in other systems include, for example, a well-known broadcast IP address, a well known frequency, or an indirection mechanism similar to the PMT in which a known physical resource, such as PID, frequency, or IP address, contains a table which maps available streams or other resources to their physical locations.

The enhancement itself may "listen to" or otherwise monitor a Trigger stream. The problem of identifying the Trigger stream is similar to the problem of identifying the Announcement stream, and can be solved by similar means. In addition, the physical resource containing the Trigger stream may be specified in the Announcement stream. In this case the enhancement may refer back to the Announcement that launched it, and find the physical location there.

Both the enhancement and the program on the client responsible for listening to Announcements and launching enhancements can use the Content stream. Because there may be multiple resources on a single Content stream, a mechanism is needed to map individual resource references to physical locations within the Content stream. Such a mechanism is found in a Table of Contents (TOC) for the Content stream. The TOC for the Content stream is normally contained in the Announcements stream, to which the client is automatically listening. After receiving the TOC, the client uses the information in it to establish a mapping between the names of the individual items on the Content stream and the subsections of the stream that contain those items.

For example, in the case where the streams are contained within MPEG transport streams, the TOC can establish the relationship between the reference (URL, URI, or other) that identifies the particular content item ("http://www.quizshow.com/quizshow.html") and the table ID and/or extended table ID of that item within the Content stream (table ID 0x80, extended table ID 0x4ef8). If there is more than one Content stream available, there is additional information pertaining to which Content stream the content item is on, for instance a known PID (PID 0x2e, table ID 0x80, extended table ID 0x4ef8), or other identifier for the Content stream, i.e. 0x93-01-0x80-0x4ef8, where 0x93-01 identifies the stream within the service uniquely by stream type and component tag in the PMT descriptors, or other mechanism specific to the particular transport used.

Figure 3:
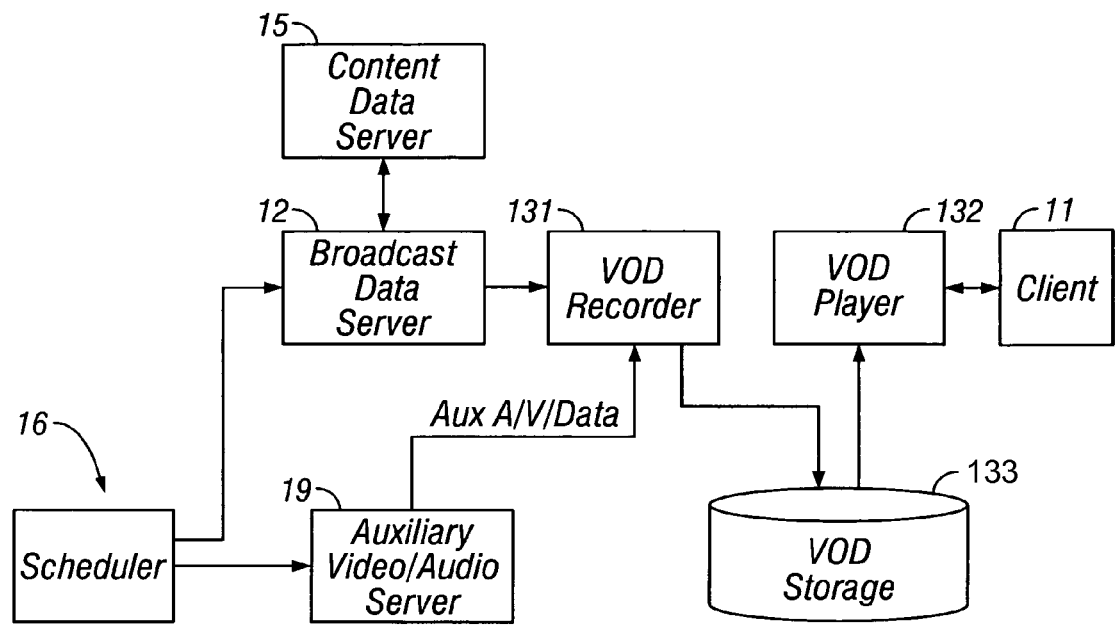
FIG. 3 is a block schematic diagram of a system architecture according to the invention when the invention is applied to a Video On Demand (VOD) system.
Figure 4:
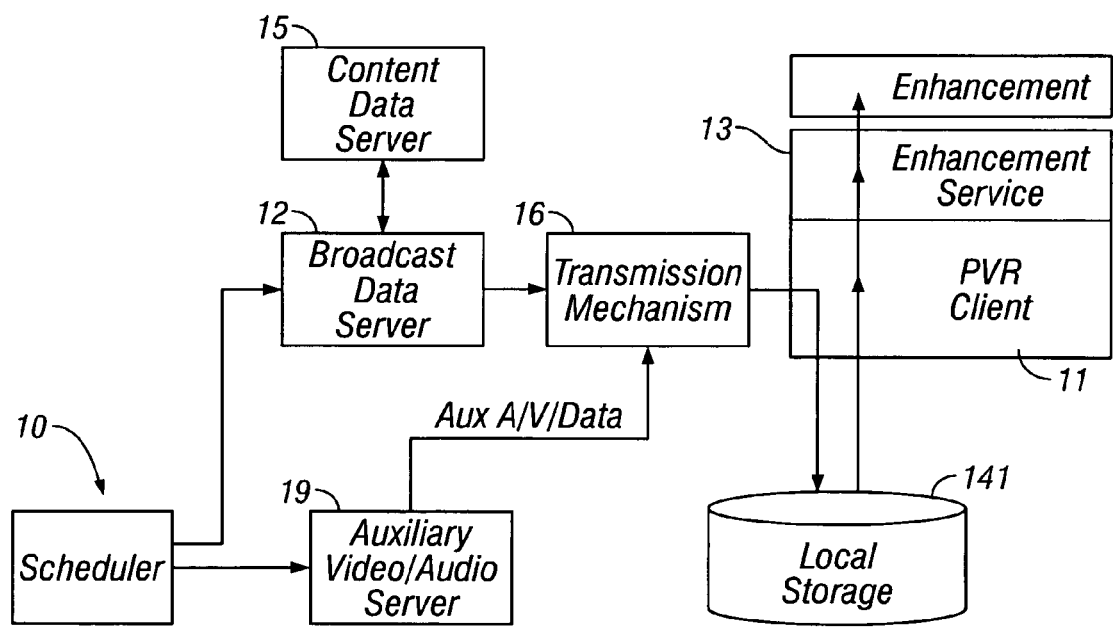
FIG. 4 is a block schematic diagram of a system architecture according to the invention when the invention is applied to a Digital Video Recorder (DVR) system.

As additional examples, alternate specific embodiments of the invention are given in FIGS. 2, 3, and 4.

In FIG. 2, the broadcast data server 12 if FIG. 1 is replaced by a data source and storage medium 12a, and data on the storage medium is then sent directly to the transmission mechanism 16.

FIG. 3 shows an embodiment of the invention in a VOD environment. In this case, the transmission mechanism consists of a VOD recorder 131, VOD storage device 133, and a VOD player 132. The broadcast data server 12 and auxiliary video/audio server 19 feed into the VOD recorder 131, where the combined data are formatted and sent to into storage in the VOD storage device 133 for playback at a later time. The VOD player 132 is responsible for sending this data to the client in response to a client request. Note that for simplicity the Announcement, Trigger, Content, and Auxiliary data streams are represented by a single line in FIG. 3, however they are still separate streams and no significant departure from their use in FIG. 1 is implied or indicated.

FIG. 4 shows an embodiment of the invention in a Digital Video Recorder (DVR) environment. In this environment, the streams from the transmission medium are stored for an indeterminate period of time in local storage 141 on the client, instead of being sent immediately to the enhancement and enhancement service. Playback from local storage begins on the user's command. Again, for simplicity, Announcement, Trigger, Content, and Auxiliary data streams are represented by a single line, and again, no significant departure in these streams from the diagram in FIG. 1 is implied or indicated.

Distribution and Synchronization

Some types of information, for instance state information carried on a Trigger Stream, must be delivered to the enhancement on the client at a guaranteed time. Such a mechanism, for instance, allows tight synchronization of events in a television broadcast with events within the enhancement.

In the presently preferred embodiment of the invention, a mechanism is provided whereby timing information is transmitted from the server to the client, and information on the client can be guaranteed to be delivered to the enhancement at a particular time, according to this timing information. This timing information is specific to a particular enhancement, allowing multiple enhancements to run simultaneously and independently.

This mechanism comprises a means to set the state on the server, a protocol for transmitting that state to the client, and a method for the client to ensure that events are delivered at the appropriate times.

On the server, the main data streams are split into data substreams, one for each enhancement, which can be addressed independently in commands to the server. These data substreams can be created and destroyed programmatically, that is, in commands to the server, and may share physical resources within their main data stream. For instance, if the server has an XML command interface, a command to create a data substream can have the following syntax:

```
<CAROUSEL NAME="kqed">
    <CREATEVIRTUAL NAME="trigger512"/>
    <DESTROYVIRTUAL NAME="trigger511"/>
<CAROUSEL>
``` where the <CAROUSEL> tag identifies the main data stream, and the <CREATEVIRTUAL> and <DESTROYVIRTUAL> tags identify the data substreams to be created and destroyed within that main data stream.

Timing state is set for a data substream by creating a virtual time base for the substream. This time base is initialized by specifying an absolute time and corresponding time base time, for instance,

```
<CAROUSEL NAME="kqed" VIRTUAL="trigger512">
    <SYNCHRELATIVE="0" UTC="2001-12-20T02:30:00"
    CONTINUOUS="false"/>
</CAROUSEL>
``` which sets/initializes the time base of substream "trigger512" to 0 at UTC time Dec. 12, 2001, 2:30:00. There is no requirement that time on the virtual time base move forward in real time, that is, one second per second, although it is anticipated that in many cases it will.

Note that absolute time may be specified by any number of different mechanisms: UTC time, GMT time, Pacific Daylight Time, number of seconds since a defined epoch, among others. The only requirement is that the server understands the time encoding used, and is able to schedule the specified event for the appropriate moment in time. In the case where previously stored data are read back from a file, a mechanism such as the SMPTE time code, which specifies time in streaming video files, can be used to specify time.

After a time base has been initialized, it can be manipulated through commands to the server. Time can be moved around, for instance sped forward or backward, or jumped to a specific new time in the time base. In the XML example, for instance, use of the CONTINUOUS="false" attribute-value in the SYNCH tag means that time on the time base should jump to the new value at the specified UTC time. Similarly, CONTINUOUS="true" means that that time should be quickly moved forward or back to the new time base time at the specified UTC time. Note that a discontinuous jump in time means that events between the current time and the new time are not delivered to the enhancement, whereas a continuous jump means that all events between the current time and the new time should be delivered immediately once the jump occurs.

The synthetic time base may also be paused at any time through a command to the server. Such a command, in XML format, could appear as

```
<CAROUSEL NAME="kqed" VIRTUAL="trigger512">
    <PAUSE UTC="2001-12-20T02:30:00">
</CAROUSEL>
```

Pause times may be specified in absolute time (UTC, GMT, or other), in the synthetic time base of the substream, or through any other mechanism that can be used to identify a time uniquely to the server.

The time base associated with a substream may also be destroyed without destroying the substream itself. This may be useful when the substream is being used to carry items that are not time dependent, or when the system wishes to put the time base into a temporary suspended state. In the XML example, such a command to the server could be:

```
<CAROUSEL NAME="kqed" VIRTUAL="trigger512">
    <UNSYCH UTC="2001-12-20T04:30:00">
</CAROUSEL>
```

As with pause times, unsync times may be specified in absolute time, the synthetic time base of the server, or any other mechanism that uniquely identifies time to the server.

It is to be noted that these pause, resume, create, destroy, synch, and unsynch concepts apply to the synthetic time base attached to a data substream. The state of the enhancement itself need not be changed.

The protocol to transmit this timing information to the client consists of time pulses that are associated with the data substream. These time pulses are delivered regularly to the client, and consist of the current time on the substream's time base.

Information about coming events, such as upcoming time transitions, may also be transmitted to the client. Such information should be transmitted multiple times to the client because losses within the transmission mechanism can prevent receipt of any particular piece of data.

For instance, if these time pulses where transmitted as strings, a typical time pulse looks like:

trigger512/T"25000 where trigger512 indicates the data substream and where T" the standard time pulse of a running time stream with a time of 25000 ms.

Similarly, time pulses associated with a paused stream might have a special code, such as:

trigger512/Z"25000 which indicates that the time base associated with data substream trigger512 has been paused at time 25000 ms. Communicating the distinction between paused and unpaused time bases to the client is especially important when the client may start receiving data on the substream at any time: the internal state of the client may be set very differently if it first receives a paused time pulse rather than a standard time pulse.

Time pulses associated with upcoming time base changes have two associated times, i.e. a time at which the change takes place, and a new time to set the time base at that time. For instance, trigger512/D"25000-35000 means that the time base should jump forward 10 seconds (35000 ms-25000 ms) at time 25000 ms on trigger512's time base.

It is important that the protocol for communicating between the client and the server does not necessarily include an absolute time. This allows the timing information to be entirely self-contained, which allows it to recorded along with the enhancement, and played back at a later time without any loss of coherence. It is expected that this mechanism is of use not just in synchronizing enhancements with other data sources, but also in "digital video recorder" (DVR) and video on demand (VOD) applications, where the time line associated with the media can be manipulated by the end user. In cases where the data streams are replayed at a later date, the data source could directly operate on files, or could be injecting data into a real-time recording system.

Figure 5:
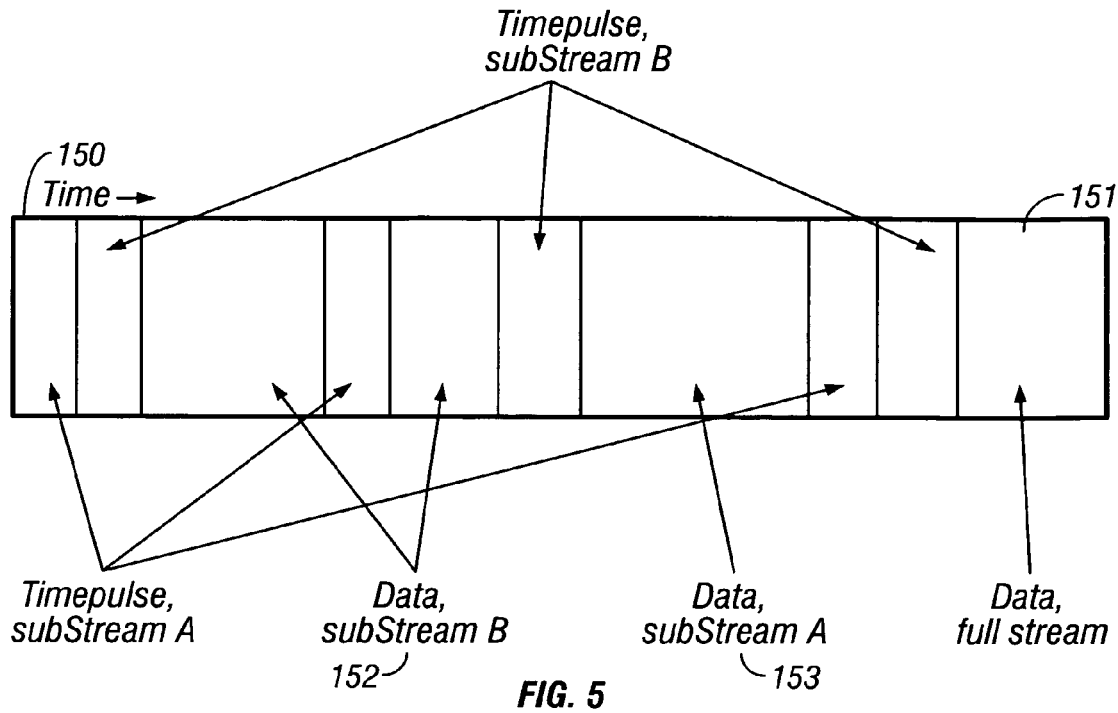
FIG. 5 is a block diagram illustrating multiplexing of time pulses and data associated with different substreams in one data stream.

FIG. 5 shows the multiplexing of data and timing information for two data substreams, subStream A and subStream B, on a single data stream 150. Note that the main data stream may contain data 151 that are not associated with a substream, as well as data 152, 153 that are specific to each contained substream.

Individual items that are to be delivered to the enhancement at specified times according to the synthetic time base can be sent multiple times from the server, and are sent before they are scheduled to be delivered. This mechanism ensures that the data are available to the client before they are needed by the enhancement, and in the case of a lossy transmission medium, guarantees as much as possible that the data are actually received by the client.

On the client side, the client uses these pulses to recreate the internal time base associated with the data substream. Data are not guaranteed to be transmitted to the client without loss, and transmission delays within the client itself or the in broadcast medium are likely to cause jitter in the reception of these time pulses. The client applies an appropriate smoothing algorithm, for instance a calculated average over eight time pulses, to recreate the original time base from the incomplete data that it receives.

The actual data that are to be transmitted according to the internal time base are sent along with an identifier of the data substream to which they belong, and the time in that substream's time base in which they are to be presented to the enhancement. Again, to ensure correct reception, these data are transmitted early to the client, and may be transmitted multiple times.

For instance, the server can be told to place a simple name value pair in the data substream with the following XML command:

```
<CAROUSEL NAME="kqed" VIRTUAL="trigger512">
<ITEM>
    < SCHEDULE START="25000" DELIVER="35000"
    INTERVAL="1000">
    <DATA NAME="question" VALUE="What is the price of tea in
    China?">
    <DATA NAME="answer1" VALUE="1500 yuan/kg">
    <DATA NAME="answer2" VALUE="2500 yuan/kg">
    <DATA NAME="answer3" VALUE="More than I can afford">
</ITEM>
</CAROUSEL>
```

In this example, data consisting of four name value pairs are to be put into the data substream trigger512 in main data stream kqed. The data are placed in the stream at the data substream's internal time of 25000 ms, for delivery to the enhancement 10 seconds later, at internal time of 35000 ms. These data are to be sent every second (1000 ms).

Although this example uses data only in the form of string name value pairs, this is not intended as a restriction. Data delivered in this fashion can be arbitrary: they need only be associated with a particular synthetic time and a data substream carrying the synthetic time base.

On the client side, the enhancement or enhancement service may choose to listen to any of the data substreams that it wishes, and need not receive information for the others. In an MPEG system, this can be accomplished by adding additional descriptors to the substream that are used to differentiate it from other substreams, or by adding identifiers to the individual items on the substream that reflect the substream to which those items are associated. Other mechanisms are possible with other broadcast media.

In reference to the enhancement system as presented above, this mechanism can be used to guarantee the delivery of any items on the three main data streams at a particular time in a substream's time base. For instance, a data substream can be set up on the Trigger stream for an enhancement using that stream. The enhancement then receives time sensitive information at a particular time within its own time base. Furthermore, multiple enhancements can share the same Trigger stream, but each enhancement is associated with a different substream within that stream. In this case, each enhancement receives trigger data at a time specified in the time base of its own substream, which may or may not correspond to the time bases of substreams of the other enhancements. Time in two enhancements, as defined by the time base of their associated trigger streams, need not even flow at the same pace in the two enhancements, even if they are running simultaneously.

Because of the programmatic and dynamic nature of the substreams, enhancements from multiple independent and mutually unaware sources can coexist in a single system. For instance, an enhancement on the ESPN can be set up and scheduled without any need for knowledge of an enhancement associated with an ad break. They both reference their own internal time bases, create and destroy their own internal substreams, and receive only their own data, even though they are running at the same time.

Announcements and Preloading

The announcement stream is used to transmit information concerning the availability of enhancements on the system, as well as information about how to initialize the enhancement and what resources it needs to run. Information transmitted by the announcements may consist of times, relative to the receipt of the announcement, that the enhancement should begin and end; times, also relative to the receipt of the announcement, during which the enhancement should be paused and its interface removed from the users perception (this feature is useful for inserting advertisements into the enhancements, for example); a URL or other reference to the main program or resource bundle associated with the enhancement; a URL or other reference to an item to be used to prompt the user to start the enhancement; and a URL or other reference to content intended to be loaded before the enhancement begins.

A list of announcement items is contained in Table 1 below. It is not meant to be an exhaustive list of all possible items in an announcement, nor are all of the items considered to be mandatory.

TABLE 1

Announcement Items

| Item Name | Purpose |
| --- | --- |
| startTime | time in seconds after receipt of the announcement at which prompting for the enhancement should begin. If there is no prompt, time at which the enhancement should begin |
| pauseTime | time in seconds after the receipt of the announcement at which the enhancement should be paused, and all UI made invisible to the user |
| resumeTime | time in seconds after the receipt of the announcement at which the enhancement should be resumed from the pause state. UI should be made visible again at this time |
| killTime | time in seconds after the receipt of the announcement at which the enhancement should be terminated |
| id | identifier for the enhancement |
| org Id | identifier for the organization |
| profile | profile for the run time environment of the enhancement - HTML3.2, HTML4.0, Java, etc |
| url | reference to the initial enhancement content to be loaded and run |
| prompt | reference to image used to prompt user to enter enhancement, may also specify system specific default prompt |
| promptSize | size of the prompt (width, height) |
| promptLoc | location of the prompt (x, y) |
| promptDuration | length of time to display the prompt |
| promptAcceptKey | Key on the client used to accept the prompt |
| memory | amount of client side memory required by the announcement |
| triggerUrl | reference to stream used for triggers associated with the enhancement. Used by the enhancement, in conjunction with a client side API for listening to streams, to listen to the trigger stream |
| preloadUrl | comma delimited list of references to content which must be loaded on the client before the enhancement is run and before any prompting or other indication of the availability of the enhancement is made to the user. |

On the client, the software listening to the announcements may launch an announced enhancement, per the information contained in the announcement. The listening software does not have the option of launching an enhancement that is not contained in the announcement, and does not have the option of launching the enhancement in a way inconsistent with the announcement. It may, however, decide not to launch the enhancement at all, due to insufficient resources on the client, an inability to find the enhancement data, policies set by other software running on the client, user preferences, or any other reason.

Interactions with Other Client Sub-Systems

The invention also comprises a technique for allowing enhancements to interact with other modules in the client in a secure manner. Enhancements are typically programs or program fragments, either in interpreted form or in abstract byte code form, and can be considered as a program in a general purpose computing environment. In many systems, there is a privilege level that controls what actions a program may perform. For example, an enhancement may be allowed to open a new window, or may not. The program makes function calls to various system resources, which can be implemented in native software, interpreted code, or abstract byte code. The privileges of the program are one of the factors the system software uses to determine whether the program is allowed access to those functions. The privilege level at which a program run is associated with the program's execution context. A problem arises when a lower privilege program needs to use functions for which it is not privileged. Typically, it is desired to give the lower privileged program access to a very restricted subset of the privileged functionality, which is why simply granting a higher level of privilege to the lower privileged program is undesirable.

As an example of this problem in common usage today, many networked applications, such as Java and JavaScript, make use of an Access Control List (ACL), which specifies URLs, or URL domains, of trusted content. This list is typically transmitted to the client by network operators, and decisions about whether to allow content to access privileged functionality are made by comparing the URL of the content with the privileged URLs in the ACL list.

The difficulties of this approach are two fold:

1. It is not flexible enough. Typical ACL systems provide only a few levels of pre-assigned privileges, and they do not correspond well to the needs of enhancement systems.

2. Maintaining the ACL list is problematic for the network operators. Because the ACL list is a set of URLs with corresponding privileges, each time new privileged content is made available to the system, the ACL list may need to change. This is especially troublesome in distributed system, such as enhanced TV, where the people responsible for distributing the content, i.e. the broadcasters, are not the people responsible for maintaining the ACL list, i.e. the cable, terrestrial, or satellite TV operators.

Figure 6:
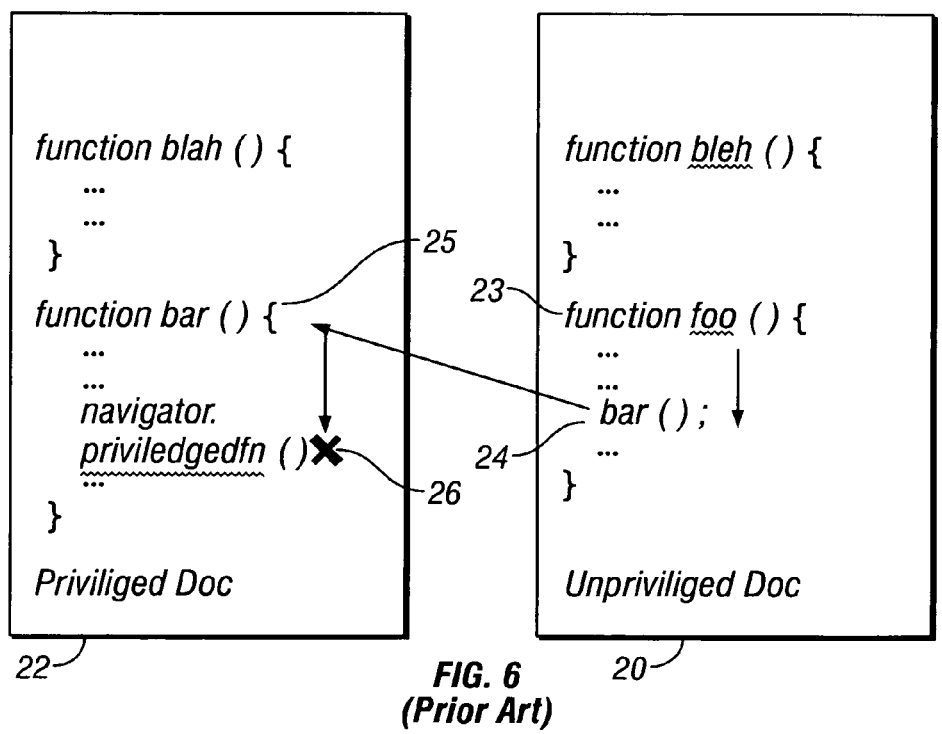
FIG. 6 is a block diagram that illustrates the problem of accessing a privileged function from an unprivileged document.

FIG. 6 is a block diagram that illustrates this problem of accessing a privileged function from an unprivileged program. In this situation, an unprivileged program 20 has a function foo 23 that calls 24 a function bar 24 which is a privileged function 26 that resides in a privileged program 22. Here, the context of the unprivileged program cannot access the privileged function.

The invention solves this problem by allowing a privileged program to publish functions which the implementer wishes to make accessible to less privileged programs. The mechanism for the publication is string based, that is, the privileged program specifies by name the function the implementer wishes to publish, the name under which the published function is to be known, and one or more strings corresponding to the privilege levels that a subscribing program must have to access the function. When an unprivileged program calls a privileged function published in this way, the context of the unprivileged program is temporarily swapped with the context of the privileged program.

Figure 7:
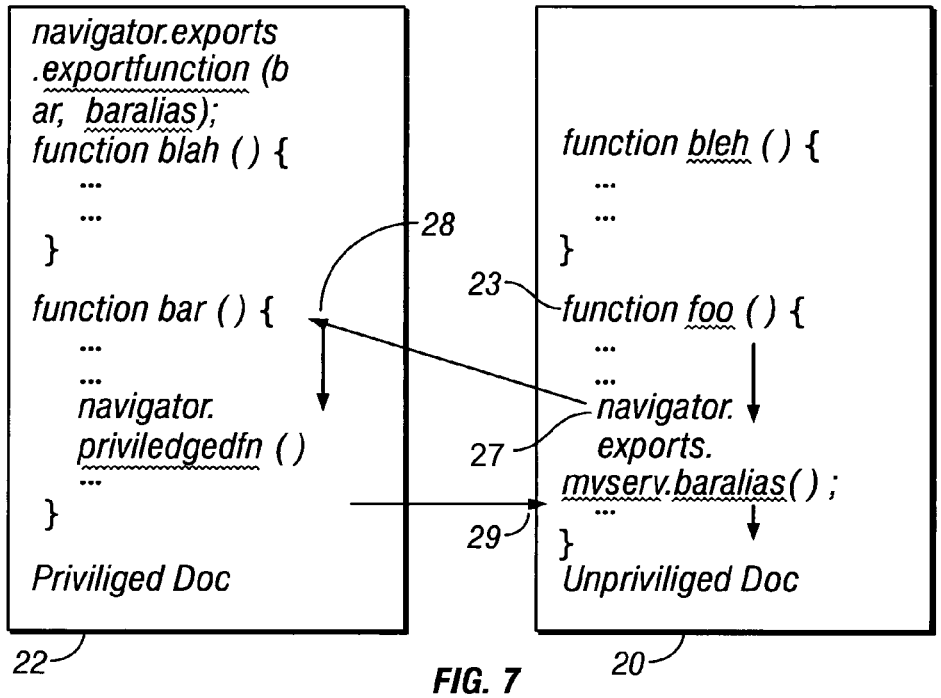
FIG. 7 is a block diagram that illustrates a technique for accessing a privileged function from an unprivileged document according to the invention.

FIG. 7 is a block diagram that illustrates the technique for accessing a privileged function from an unprivileged document according to the invention. As shown on FIG. 7, the program swaps contexts 27, 29, so that the thread of control 28 temporarily runs in the privileged context.

Permissions to access these published functions are granted by highly privileged programs. The highly privileged program associates a privilege with a function. Typically, this is a comma-delimited string of custom privileges with the context of a program with lower privileges, although the invention also allows standard privileges to be so granted. If any of the privileges granted to the lower privilege program matches any of the privileges that a published function was published with, the lower privilege program may access the published function.

By allowing both standard privileges and custom privileges to be granted, the invention not only creates arbitrary flexibility in privilege levels, but can also subsume the standard privilege mechanisms. In practice, for instance, this mechanism can be used to eliminate the need for the ACL list currently used by network operators.

In use, this feature can take the form:

navigator.exports.exportFunction("grpName","aliasName",function, "privString"), where:

"grpName" is the name of an arbitrary grouping of similar services under which the function is exported, "aliasName" is the name by which the exported function is known, and "privString" is a comma separated list of privileges needed to access the function (any privilege in the list grants access).

For instance, "navigator.exports.exportFunction("etv", "myPriv", privFunc1, "etv") exports the function privFunc1 as:

navigator.exports.etv.myPriv( )

and only contexts with the custom "etv" privilege are allowed to use it.

In the preferred embodiment of the invention, the feature of exporting functions is a highly privileged operation. Thus, one can also unexport a previously exported function.

For the function:

navigator.exports.unexportFunction(srvName, funcName)

When a function has been unexported, or if a context lacks permissions to see the function, the function object appears null.

A symmetric problem to the above occurs when a privileged program wishes to use functions defined by unprivileged programs. Typically this occurs when the standard API defined for allowing the two programs to interact requires a callback to be provided by the less privileged program to the more privileged program.

In this case, the more privileged program is expected to call the callback of the less privileged function. Because the callback is part of the less privileged program, it cannot be trusted in the same way as the more privileged program. However, if the callback is called directly from the more privileged program, it is run in the context of the more privileged program, and has that program's trust level and security access.

Figure 8:
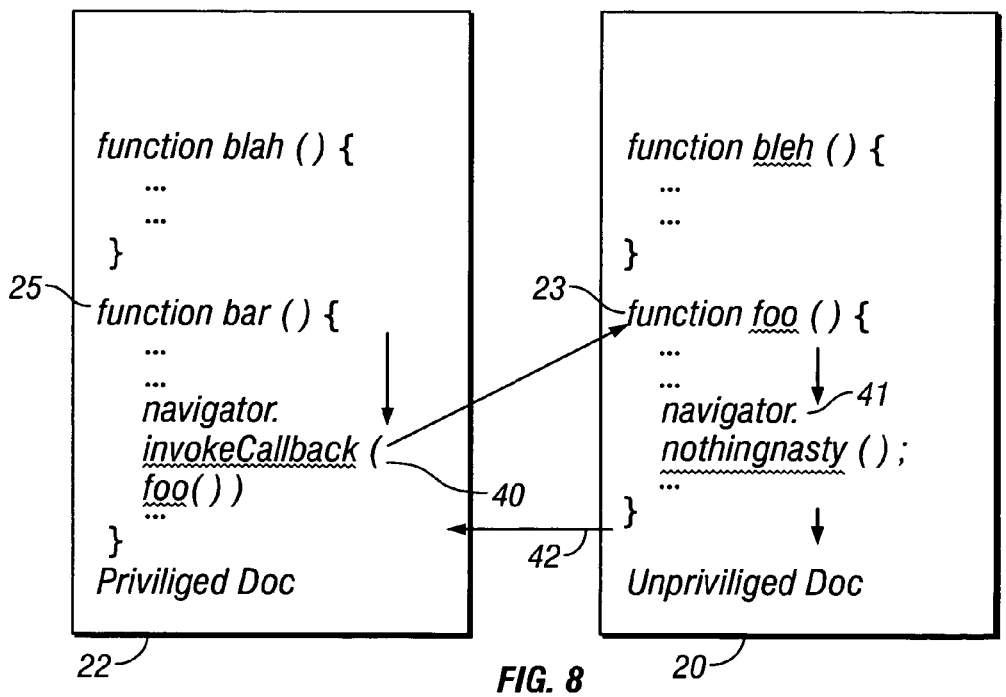
FIG. 8 is a block diagram that illustrates a technique for signaling between privileged and unprivileged contexts without granting security access according to the invention.

The solution to this problem is essentially similar to the solution for the symmetric case—. A special call is made which allows the callback to be run in the less privileged context. FIG. 8 is a block diagram that illustrates a technique for signaling between privileged and unprivileged contexts without granting security access according to the invention. In this case, however, there is no need for custom defined privileges because the higher priority program is assumed to be privileged enough to invoke lower privilege functionality.

A sample implementation in JavaScript is as follows:
navigator.exports.invokeCallback(window, this, func)
Where:
window defines which context to use for the callback
this is the "this" when the function is called
func is the function to be invoked.

The function invokeCallback( ) returns an object with two properties:
result—the return value of the function called
failed—whether or not that function threw a JS Error.

In JavaScript, capturing the return values in this way allows the caller's thread not to be aborted by an error made by the callee.

This security and privilege-granting mechanism is applicable to other programming languages as well, including Java and other-bytecode-oriented systems.

Typically, Enhanced TV is thought of in terms of current television distribution systems, such as analog broadcast or digital cable and satellite. It is equally applicable to other distribution mediums and display devices over which video and audio can be delivered, including IP-based systems (such as video over DSL) and video over wireless networks (such as distribution over a 3G network to a mobile phone.)

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method comprising:
receiving at a computer server a plurality of data substreams, each data substream indicating a timing state of a respective set of content presentable by one or more client devices, the timing state of each respective set of content being relative to a respective virtual time base of a plurality of virtual time bases; and
multiplexing timing information and the plurality of data substreams into a data stream, wherein the timing information includes instructions for advancing one virtual time base of said plurality of virtual time bases independent of one or more other virtual time bases of said plurality of virtual time bases.

2. The method of claim 1, wherein each data substream is individually addressable and individually selectable by each of the one or more client devices.

3. The method of claim 1, wherein said data stream is an MPEG stream identified with a program identifier.

4. The method of claim 1, further comprising:
receiving each set of content at the computer server;
multiplexing the sets of content into one or more content streams.

5. The method of claim 4, further comprising:
storing the data stream and the one or more content streams to a video-on-demand server with one or more auxiliary video data streams.

6. The method of claim 5, further comprising:
in response to a request from one of the one or more client devices, transmitting at least one of the one or more auxiliary video data streams, at least one of the one or more content streams, and the data stream from the video-on-demand server to the one of the one or more client devices.

7. The method of claim 1, wherein the timing information includes timing pulses inserted regularly within the data stream, wherein the timing pulses, when interpreted by the one or more client devices, synchronize a presentation of one of the sets of content with one or more auxiliary video programs.

8. The method of claim 7, wherein the timing pulses include a current virtual time for the respective virtual time base of the one of the sets of content.

9. The method of claim 7,
wherein the timing pulses cause a jump from a current virtual time to a new virtual time of the respective virtual time base of the one of the sets of content, and wherein the timing pulses indicate whether an event of the one of the sets of content between the current virtual time and the new virtual time is skipped when the jump is executed by the one or more client devices.

10. The method of claim 7, wherein the timing pulses advance one of the plurality of virtual time bases at a different rate relative to real time.

11. The method of claim 1, wherein each respective set of content includes machine-readable instructions executable by the one or more client devices for presenting an enhancement with one or more videos by the one or more client devices.

12. A system comprising one or more computers storing one or more programs that when executed by the one or more computers cause the system to:
receive a plurality of data substreams, each data substream indicating a timing state of a respective set of content presentable by one or more client devices, the timing state of each respective set of content being relative to a respective virtual time base of a plurality of virtual time bases; and
multiplex timing information and the plurality of data substreams into a data stream, wherein the timing information includes instructions for advancing one virtual time base of said plurality of virtual time bases independent of one or more other virtual time bases of said plurality of virtual time bases.

13. The system of claim 12, further comprising a video-on-demand server including storage memory, wherein the one or more programs, when executed by the one or more computers, further cause the system to:
store one or more auxiliary video data streams and the data stream to the storage memory; and
in response to a request from one of the one or more client devices, provide at least one of the auxiliary video data streams and the data stream from the video-on-demand server to the one or more client devices.

14. The system of claim 13, wherein the one or more programs, when executed by the one or more computers, further cause the system to:
store one of the sets of content to the storage memory, wherein the one of the sets of content includes machine-readable instructions executable by the one or more client devices; and
in response to the request, provide the one of the sets of content to the one or more client devices.

15. The system of claim 12, wherein the timing information includes timing pulses inserted regularly within the data stream, wherein the timing pulses, when interpreted by the one or more client devices, synchronize a presentation of one of the sets of content with one or more auxiliary video programs.

16. The system of claim 15, wherein the timing pulses include a manipulation causing one of the plurality of the virtual time bases to advance at a different rate relative to real time.

17. One or more non-transitory computer readable memory having one or more programs stored thereon, that when executed by a computer, cause the computer to:
    multiplex timing information and a plurality of data substreams into a data stream; and
    transmit the data stream to one or more client devices,
    wherein each data substream indicates a timing state of a respective set of content presentable by the one or more client devices, the timing state of each respective set of content being relative to a respective virtual time base of a plurality of virtual time bases, and
    wherein the timing information advances one virtual time base of the plurality of virtual time bases independent of one or more other virtual time bases of the plurality of time bases.

18. The one or more non-transitory computer readable memory of claim 17, wherein each respective set of content includes an enhancement presentable with one or more videos by the one or more client devices.

19. The one or more non-transitory computer readable memory of claim 17, wherein the timing information includes timing pulses inserted regularly within the data stream, wherein the timing pulses, when interpreted by the one or more client devices, synchronize a presentation of one of the sets of content with one or more auxiliary video programs.

20. The one or more non-transitory computer readable memory of claim 19, wherein the timing pulses include a manipulation of one of the plurality of the virtual time bases.

* * * * *